United States Patent
Bock et al.

(10) Patent No.: US 6,931,175 B2
(45) Date of Patent: Aug. 16, 2005

(54) OPTICAL NODE WITH ADD-DROP OR CROSS-CONNECT FUNCTIONALITY

(75) Inventors: Harald Bock, Augsburg (DE); Patrick Leisching, München (DE); Alexander Richter, München (DE); Detlef Stoll, Boca Raton, FL (US)

(73) Assignee: Siemens Aktiengesellschaft, Munich (DE)

( * ) Notice: Subject to any disclaimer, the term of this patent is extended or adjusted under 35 U.S.C. 154(b) by 143 days.

(21) Appl. No.: 10/343,208

(22) PCT Filed: Jul. 20, 2001

(86) PCT No.: PCT/DE01/02771

§ 371 (c)(1),
(2), (4) Date: Aug. 25, 2003

(87) PCT Pub. No.: WO02/15632

PCT Pub. Date: Feb. 21, 2002

(65) Prior Publication Data

US 2004/0042711 A1 Mar. 4, 2004

(30) Foreign Application Priority Data

Jul. 27, 2000 (DE) .......................................... 100 36 709

(51) Int. Cl.[7] ............................................. G02B 6/28
(52) U.S. Cl. .............................. 385/24; 385/17; 398/43
(58) Field of Search .................. 385/14–24; 398/79–84, 398/43–50

(56) References Cited

U.S. PATENT DOCUMENTS

| | | | |
|---|---|---|---|
| 5,986,783 A | | 11/1999 | McAdams et al. |
| 6,262,821 B1 | * | 7/2001 | Fevrier et al. ................. 398/48 |
| 6,272,154 B1 | * | 8/2001 | Bala et al. .................... 370/535 |
| 6,404,940 B1 | * | 6/2002 | Tsuyama et al. ............... 385/17 |
| 2002/0012143 A1 | * | 1/2002 | Graves et al. ............... 359/128 |
| 2002/0131678 A1 | * | 9/2002 | Bentivoglio Ravasui et al. 385/17 |

FOREIGN PATENT DOCUMENTS

| | | |
|---|---|---|
| EP | 0 620 694 | 10/1994 |
| EP | 0 752 794 | 1/1997 |
| EP | 0 905 936 | 3/1999 |

* cited by examiner

*Primary Examiner*—Ellen E. Kim
(74) *Attorney, Agent, or Firm*—Bell, Boyd & Lloyd LLC (57) ABSTRACT

An optical network node is provided having add-drop and/or cross-connect functions, wherein the optical network node includes a first optical line with a first drop branch and a first add branch, and a second optical line with a second drop branch and a second add branch, wherein the first drop branch and the second drop branch are in each case connected to a first cross-connect and to a second cross-connect, the first add branch is connected to the first cross-connect and to the second cross-connect via a first wavelength converter, and the second add branch is connected to the first cross-connect and to the second cross-connect via a second wavelength converter.

16 Claims, 6 Drawing Sheets

OPTICAL NODE WITH ADD-DROP OR CROSS-CONNECT FUNCTIONALITY

BACKGROUND OF THE INVENTION

The present invention relates to an optical network node with add-drop and/or cross-connect functions. Due to the increasing volume of data in optical networks, existing network capacity must be utilized optimally. At present, known add-drop multiplexers are not able to satisfy these increased demands on the network since they often only can be used statically. To provide optimal utilization of the network capacity, therefore, new and more comprehensive concepts for optimizing the traffic routing are necessary.

A further disadvantage of known optical add-drop multiplexers is that the network cannot be optimally occupied with transmit wavelengths. If, in the WDM network, wavelengths are occupied which should be fed in via an optical add-drop multiplexer, the tributary input of the optical add-drop multiplexer is blocked. It is not possible to feed a transmit wavelength into the optical WDM network.

Wavelength conversion in WDM networks previously only has been possible via an additional element; namely, with the aid of a transponder. This represents additional hardware expenditure and can lead to a further deterioration in the signal.

An additional disadvantage in previous optical add-drop multiplexers is that the tributary inputs only can be interconnected at the electrical level. Interconnection of the tributary inputs which is based on a uniform optical concept is not known.

It is, therefore, an object of the present invention to provide an optical network node with add-drop and/or cross-connect functions which enables wavelengths received, or to be transmitted, to be configured completely and freely.

SUMMARY OF THE INVENTION

Accordingly, the present invention is directed toward an optical network node with add-drop functions, wherein the optical network node exhibits a first optical line with a first drop branch and a first add branch and a second optical line with a second drop branch and a second add branch. The first drop branch and the second drop branch in each case are connected both to a first cross-connect and a second cross-connect, particularly, optical cross-connects. The first add branch is connected to the first cross-connect and to the second cross-connect via a first wavelength converter.

The second add branch is connected to the first cross-connect and to the second cross-connect via a second wavelength converter.

The network node with add-drop functions is preferably arranged in such a manner that the first optical line (line east) and the second optical line (line west) preferably consist of four fibers, two fibers in each case being embodied as protection line and two being embodied as working line. Arranging a first add branch and a first drop branch at the first optical line and arranging a second add branch and a second drop branch at the second optical line ensures the add-drop functions of the network node. The network node also can be used advantageously with drop-and-continue functions.

Depending on the destination node of a path, it also can be defined for each channel which line or fiber is used as working line or protection line, respectively. For example, in a ring, the physically shorter path can be used as working line and the path in the other direction of the ring can be used as protection line irrespective of the physical fiber. The choice of a fiber as the working line also can be made dependent on parameters such as basic failure probability, current signal quality, etc.

The cross-connects are designed in such a manner that they are interconnected with the tributary side of the network node with add-drop functions and with the first and second add branches and the first and second drop branches of the first and second optical lines. The cross-connect preferably can be remotely configurable and, even more preferably, can be connected to a centralized network management system. The inputs at the tributary side consist of a working line and a protection line. Such interconnection is advantageous since, as a result, the inputs of the tributary side of the network node can be arbitrarily interconnected with the fibers of the line side of the network node with add-drop functions.

It is particularly preferred if the cross-connects consist of optical components. This makes it possible to have a cross-connect function without recourse to electrical elements. In particular, the cross-connect can be constructed of optical switching matrices. These may include, for example, elements of the integrated optics, or they can be based on prisms or operate with mirror technology.

The wavelength converter is designed in such a manner that it can convert incoming wavelengths of a particular channel wavelength into wavelengths of another channel wavelength. The wavelengths preferably are converted on the basis of an electrical wavelength conversion via transponder modules which consist of one optical receiving diode and one wavelength-tunable transmitting laser diode per channel. In a particularly preferred manner, wavelength conversion is carried out on the basis of a purely optical wavelength conversion via laser-capable material.

The wavelength converters can be arranged as a further network element before the network node with add-drop functions. The wavelength converter is particularly advantageously installed in the first or second add branch, respectively, as a result of which it is integrated in the network node with add-drop functions. The integration provides the advantage that the signal attenuation of a WDM transmit signal is not increased by a further network element.

It is preferred to use tunable transponder modules as wavelength converters. Tunable transponder modules are advantageous inasmuch as they can be remotely configured and dynamically adjusted. A tunable transponder module used is, for example, a Tunable Transponder Card, TTC.

In a preferred embodiment, the first cross-connect exhibits at least one first N#M switching matrix and at least one first K#L switching matrix while the second cross-connect exhibits at least one second N#M switching matrix and at least one second K#L switching matrix. The N#M switching matrices and the K#L are preferably optical space-division switching stages.

The N#M switching matrices and the K#L switching matrices in each case connect the working line and the protection line of the tributary side to the optical lines of the line side. This advantageously opens up the possibility of making the direction of working paths and protection paths freely selectable in the network. In a preferred manner, asymmetric switching matrices are used. As a result, the network node can be made particularly flexible in occupying the fibers with channels on the tributary side and on the line side.

In a particularly preferred embodiment, M K and N=L. This ensures that the inputs and the outputs of the tributary side and of the line side are symmetric in the channel number and arrangement. In principle, the channel allocation of the inputs and outputs of the tributary side is arbitrary. A channel allocation with 8 channels is preferred and a channel allocation with 16, 32, 64 or 256 channels is particularly preferred.

Let the number of fibers or wavelength channels on the tributary side be F. In a particularly preferred manner, N=3F. This makes it possible to ensure a collision-free switching-through of the tributary signals to the west line, the east line or a cross-connect interconnection on the tributary side. In a further particularly preferred manner M=N. This provides symmetric switching matrices. This has the advantage that the incoming and the outgoing channels can be taken into consideration equally. It is also preferred that N=F+i where I is a number from F+1 to 3 F. I in this case controls the number of fibers available for cross-connect or corresponding diversions. In the case of time-uncritical or short-term switch-overs, I=1 is possible. If collision-free switching-through, switch-over and forwarding is to be possible at any time, I=2 F. The choice of I depends on the traffic which is expected in the network node; for example, the traffic in a municipal district. I is preferably determined by predictive network planning. In particular, preferably N=2 F. This makes it possible to implement two collision-free functions in each case. In this manner, for example, it is possible to manage both a switching-through to the west line from one half of the channels and to return the other half of the channels as tributary-side cross-connect interconnection back to the tributary side.

In another particularly preferred embodiment, the first N#M switching matrix is connected to the first K#L switching matrix via a first upper and a first lower connector while the second N#M switching matrix is connected to the second K#L switching matrix via a second upper and a second lower connector. The connection contains two advantages. On the one hand, the direction of the optical paths can be changed via the connection. An optical signal in the network is coupled out via the drop branch and fed back into the network via the cross-connect and the wavelength converter, during which process, however, the direction of the optical signal has been changed. Such an arrangement of the connector makes it possible to considerably increase the utilization of capacity in optical ring networks because, due to the change in direction and the wavelength conversion, part-areas of the ring networks can be occupied with channel wavelengths. Linking the N#M switching matrices with the K#L switching matrices via a connector provides the further advantage that an interconnection of the individual inputs on the tributary side is made possible. A network node with add drop functions is preferably arranged at the interface between a wide area network and a local area network. The inputs of the tributary side then in each case represent for example, the connections to individual municipal districts. Integrating the cross-connects in the network nodes with add-drop functions guarantees an interconnection of the individual inputs of the tributary side (interconnection of the local municipal districts) by now only one network element and no longer by a further network element preceding the network node. This makes it possible to ensure local networking by now only one centralized network device which saves hardware expenditure and reduces signal attenuation.

One particularly preferred embodiment exhibits an optical network node with add-drop functions in which the first add branch and the second drop branch are arranged on a second module and the second add branch and the first drop branch are arranged on a first module. This ensures that even when one module fails, the traffic can be secured via the other module.

The first module preferably exhibits a first filter and circulator device and a first demultiplexer device in the drop function. The second module preferably exhibits a second filter and circulator device and a second demultiplexer device in the drop function. The filters are fiber gratings and, in a particularly preferred manner, a group of four or eight or more tunable gratings. The fiber grating preferably used is a fiber Bragg grating. With regard to the add function, the first and second modules exhibit a first and a second multiplexer device and a first and second coupler, the first and second couplers being in a preferred manner 1:2 couplers. The components of the modules can be arbitrarily selected but preferably are of the same type of construction.

Distributing the add-drop functions over two separate modules makes it possible to implement a protected unidirectional fiber traffic and a bidirectional two-fiber traffic without any optical single point of failure.

In a particular embodiment, the first cross-connect (300) can be used for paths of a protection line and the second cross-connect (400) can be used for paths of a working line. This provides for strict separation of working line and protection line on the tributary side. If one of the lines breaks, the network node is still completely operative.

The present invention is also directed toward a method for selecting an optical path for optical signals in an optical network node, where optical signals from the first optical line are interconnected into the first optical line or into the second optical line. The method includes the following steps. Firstly, optical signals of the first optical line are coupled out into the first drop branch, then interconnected by the first cross-connect or the second cross-connect into the second add branch or into the first add branch and then the interconnected optical signals are fed into the second optical line or into the first optical line via the second add branch or the first add branch. Analogously, optical signals from the second optical line can be interconnected into the first optical line or the second optical line. This has the advantage that the paths of the optical signals can be arbitrarily selected, and thus the direction of the optical signals can be arbitrarily determined, via the optical network node of the present invention.

The present invention is further directed toward a method for wavelength conversion of optical signals in an optical network node, the wavelengths of the signals from the first optical line being converted into the first optical line. The method includes the following steps. Firstly, optical signals of the first optical line are coupled out into the first drop branch and are then interconnected by the second cross-connect into the first add branch. The second wavelength converter is located in the first add branch. The wavelength converters convert the wavelengths of the optical signals before the converted wavelengths of the optical signals are fed into the first optical line via the first add branch. Analogously, wavelengths of optical signals from the second optical line can be converted into the second optical line. This has the advantage that the wavelengths of the optical signals in the optical paths can be arbitrarily determined via the optical network node of the present invention. Especially if a channel wavelength is already occupied in a section between two network nodes and thus the section is blocked for a particular channel wavelength, the network node of the present invention makes it possible to maintain the traffic by converting the channel wavelength. Naturally, this is also possible in the second optical line or, respectively, from the first optical line into the second optical line and vice versa.

The present invention is also directed toward a method for wavelength conversion of optical signals in an optical network node, the wavelengths of the signals from the first optical line being converted into the first optical line or into the second optical line. This method is a combination of the two preceding methods and includes the advantages of both methods. The combination provides for the advantage that, via the optical network node of the present invention, not only the paths of the optical signals can be arbitrarily selected, and thus the direction can be arbitrarily determined, but also the wavelengths of the optical signals in the optical paths can be arbitrarily selected. Especially if a channel wavelength is already occupied in a section between two network nodes and thus the section is blocked for an incoming channel wavelength, the network node of the present invention makes it possible to maintain the traffic by converting the channel wavelength.

The present invention further provides for a method for selecting an optical path for optical transmit signals in an optical network node, where optical transmit signals from a first tributary input are interconnected into the first optical line or into the second optical line. The method includes the following steps. Firstly, optical transmit signals are applied via the tributary input to a first cross-connect, then interconnected into the first add branch or into the second add branch by the first cross-connect and then the interconnected optical transmit signals are fed into the first optical line via the first add branch or into the second optical line via the second add branch. Analogously, optical transmit signals can be interconnected into the first optical line or the second optical line from a second tributary input. This has the advantage that the paths of the optical transmit signals can be arbitrarily selected via the optical network node of the present invention, and thus the direction of the optical transmit signals can be arbitrarily determined. A signal present preferably can be blocked so that it is not fed into the line west or east. This can be advantageous if wavelength channels are only to be used intermittently at the tributary side.

Moreover, the present invention provides for a method for wavelength conversion of optical transmit signals in an optical network node, the wavelengths of an optical transmit signal being fed into the first optical line from the second tributary input. The method includes the following steps. Firstly, optical transmit signals are applied via a second tributary input to a second cross-connect and then interconnected into the first add branch by the second cross-connect. The first add branch contains the second wavelength converter. The wavelength converter converts the wavelengths of the optical transmit signals before the converted wavelengths of the optical transmit signals are fed into the first optical line via the first add branch. Analogously, wavelengths of optical transmit signals from the first tributary input can be converted into the second optical line. This has the advantage that the paths of the optical transmit signals can be arbitrarily selected via the optical network node of the present invention, and thus the direction can be freely determined.

In addition, the present invention provides for a combination of the preceding methods. The wavelengths of an optical transmit signal from the first tributary input are converted into the first optical line or into the second optical line. The method includes the following steps. Firstly, optical transmit signals are applied via a tributary input to a first cross-connect and then interconnected into the first add branch or into the second add branch by the first cross-connect. The first add branch contains the second wavelength converter and the second add branch contains the first wavelength converter. The wavelength converters convert the wavelengths of the optical signals before the converted wavelengths of the optical transmit signals are fed into the first optical line via the first add branch or into the second optical line via the second add branch. Analogously, wavelengths of optical transmit signals from the second tributary input can be converted into the first optical line or the second optical line. This has the advantage that not only the paths of the optical transmit signals can be arbitrarily selected via the optical network node of the present invention, and thus the direction can be determined, but also the wavelengths of the optical transmit signals in the optical paths can be arbitrarily determined. It is especially if a wavelength is already occupied in the network and thus the network is blocked for the wavelength of the optical transmit signal, that the network node of the present invention, by converting the wavelength of the optical transmit signal, makes it possible to feed it into the network and thus to maintain the traffic.

In addition, the present invention provides for a method for interconnecting optical transmit signals in an optical network node, where an optical transmit signal from the first tributary input is interconnected to the first tributary output. The method includes the following steps. Firstly, optical transmit signals are applied via a tributary input to a first cross-connect and are then interconnected to the first tributary output by the first cross-connect. Analogously, optical transmit signals from the second tributary input can be interconnected to the second tributary output. This has the advantage that interconnection of the inputs of the tributary side is possible via the optical network node of the present invention. The optical network node of the present invention made it possible to find an integrated solution which provides for an interconnection of the inputs of the tributary side and an interconnection of the tributary side with the line side. According to the present invention, the comprehensive interconnection is now achieved by only one network element and no longer by a further network element preceding the network node.

Additional features and advantages of the present invention are described in, and will be apparent from, the following Detailed Description of the Invention and the Figures.

DETAILED DESCRIPTION OF THE INVENTION

Figure 1:
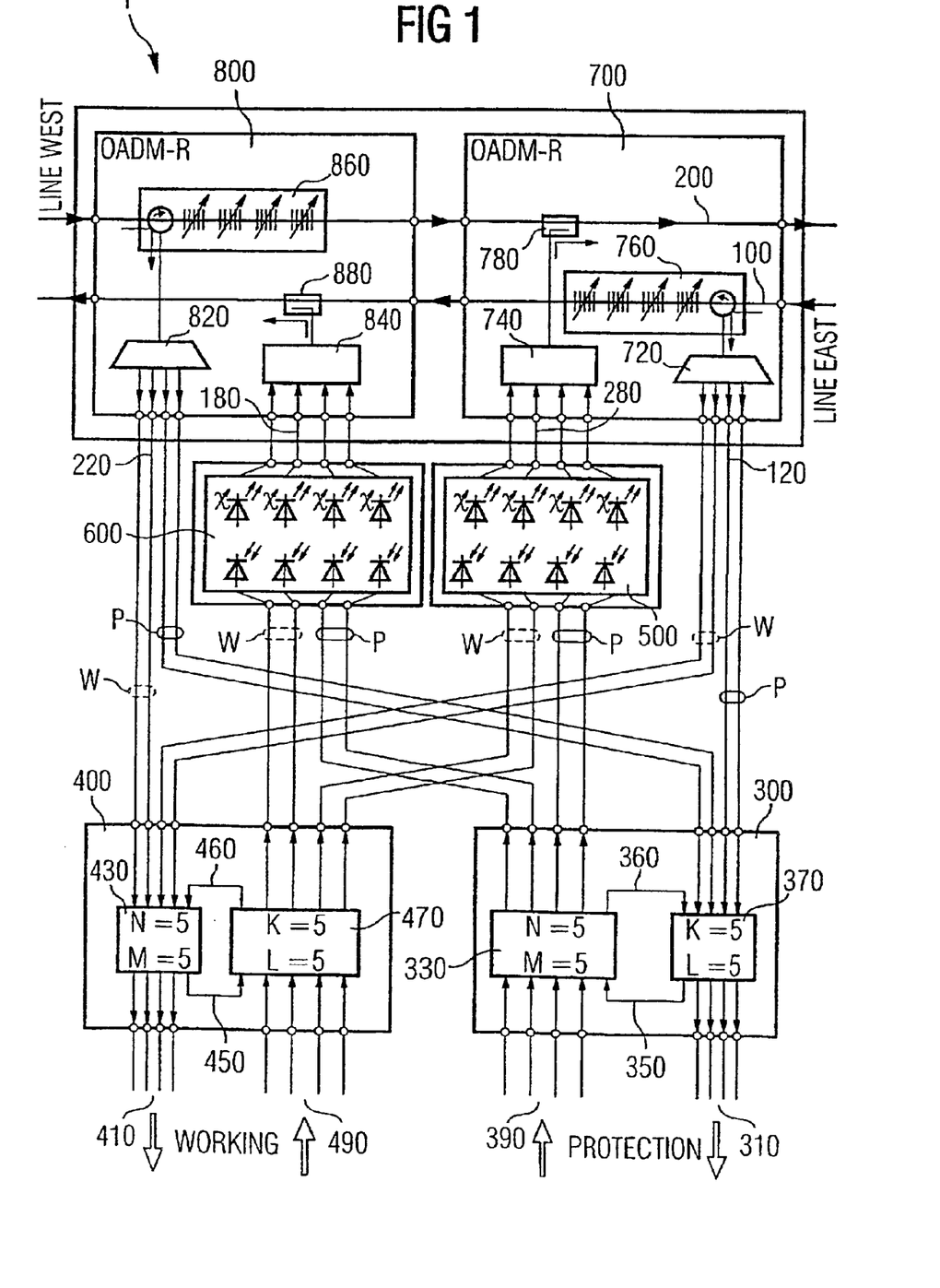
FIG. 1 shows a circuit diagram of a network node with add-drop functions according to the present invention.

FIG. 1 shows a network node 1 with add-drop functions according to the present invention. The first optical line 100 is shown as line east and the second optical line 200 is shown as line west. The first optical line 100 and the second optical line 200 are connected to a first module 700 and to a second module 800, the first drop branch 120 of the first optical line 100 and the second add branch 280 of the second optical line 200 being arranged on the first module 700. In contrast, the first add branch 180 of the first optical line 100 and the second drop branch 220 of the second optical line 200 are arranged on the second module 800. On the first module 700, the first optical line 100 is connected to the first optical drop branch 120 via the first filter and circulator device 760 and to a first demultiplex device 720 while the second add branch 280 is connected to the second optical line 200 via the first coupler 780 and the first multiplex device 740. On the second module 800, the first optical line 100 is connected to the first add branch 180 via the second coupler 880 and to the second multiplex device 840 while the second optical line 200 is connected to the second drop branch 220 via the second circulator and filter device 860 and to the second demultiplex device 820. The first drop branch 120 consists of two protection paths and two working paths and is connected to the first cross-connect 300 by the two protection paths and to the second cross-connect 400 via the two working paths. The second drop branch 220 also contains two working paths and two protection paths, the two working paths being connected to the second cross-connect 400 and the two protection paths being connected to the first cross-connect 300. The first cross-connect 300 exhibits a first M#N switching matrix 330 and a first K#L switching matrix 370 which are connected via a first lower connector 350 and a first upper connector 360. The second cross-connect 400 exhibits a second K#L switching matrix 430 and a second M#N switching matrix 470 which are connected via a second lower connector 450 and via a second upper connector 460. The first M#N and K#L switching matrices 330, 370 and the second M#N and K#L switching matrices 470, 430 are 5#5 matrices in the present case. In the present case, four fibers are provided (F=4) and one bridging line (I=1). Thus, the WDM signals of the four channels present are optionally individually interconnectable via the lower and upper connectors, respectively. The two protection paths of the first drop branch 120 and the two protection paths of the second drop branch 220 are connected to the tributary output 310 via the switching matrix 370 while the two working paths of the first drop branch 120 and the two working paths of the second drop branch 220 are connected to the second tributary output 410 via the switching matrix 430. The first tributary input 390 is connected via the first M#N matrix 330 of the first cross-connect 300 to the wavelength converter 500 via two protection paths while being connected to the wavelength converter 600 with the other two protection paths. Analogously, the second tributary input 490 is connected to the first wavelength converter 500 with two working paths via the second M#N switching matrix 470 of the second cross-connect 400 while being connected to the wavelength converter 600 with the other two working paths. The first wavelength converter 500 is connected to the second optical line 200 via the second add branch 280. The second wavelength converter 600 is connected to the first optical line via the first add branch 180. Due to this arrangement, the optical network node 1 with add-drop functions obtains via the first cross-connect 300 on the tributary side an input and, respectively, output for the protection line and, for the second cross-connect 400 on the tributary side, an input and, respectively, output for the working line.

FIGS. 2 to 6 then show possible optical paths in the network node 1 with add-drop functions according to the present invention.

Figure 2:
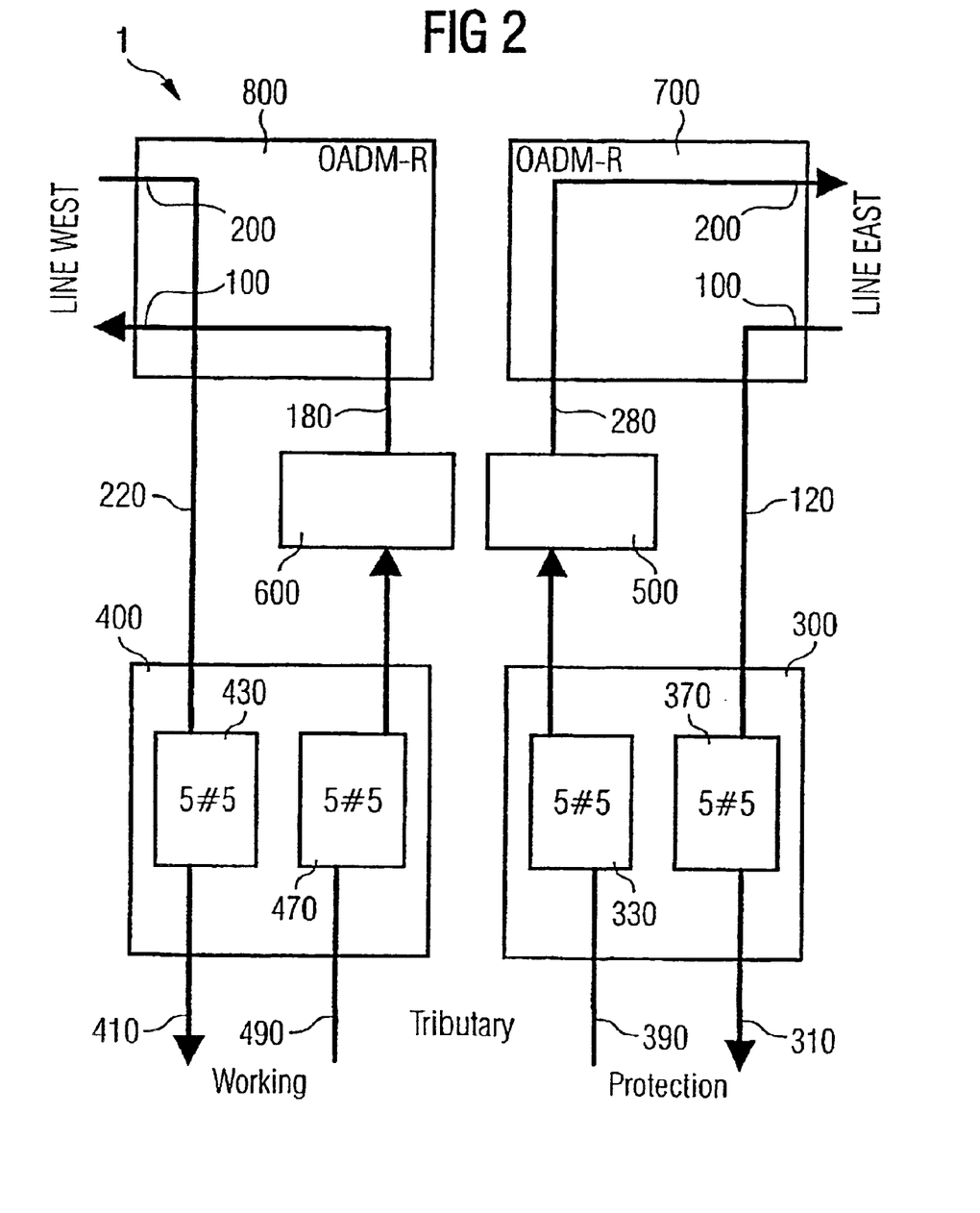
FIG. 2 shows a diagrammatic representation of a conversion of the wavelengths of an optical transmit signal when it is fed from the tributary side into the line side.

FIG. 2 is a diagrammatic representation of a conversion of the wavelengths of an optical transmit signal by a network node 1 according to the present invention when a signal is fed in from the tributary side to the line side. The components correspond to those in FIG. 1.

FIG. 2 represents the conversion of a transmit channel wavelength to an arbitrary channel wavelength available in the network. Via the second tributary input 490 (working line), transmit channel wavelengths are fed into the optical network node 1 with add-drop functions and the second cross-connect 400 with the first 5#5 matrix interconnects the wavelength of the optical transmit signal to the first wavelength converter 500. The first wavelength converter 500 changes the channel wavelength of the optical transmit signal and directs the wavelength-converted optical transmit signal via the second card module 800 into the first optical line 100 (line east). Analogously, an optical transmit signal is fed into the second optical line 200 (line west) via the first tributary input 390 (protection line) after having been converted to the channel wavelength by the first wavelength converter 500.

Wavelength conversion of the optical transmit signals is always appropriate when the wavelengths of the optical transmit signals are occupied in the network at the time the signals are fed in. This is because the respective tributary input 390, 490 is then blocked. Conversion of the wavelength always enables optical transmit signals to be fed into the network since, when wavelengths are occupied in the network, the wavelengths of the optical transmit signals are converted by the wavelength converters 500, 600 to a wavelength which is available in the network. If no wavelength conversion is required since the wavelengths of the optical transmit signals fed in are not occupied in the network, there is no conversion of the wavelengths of the optical transmit signals by the wavelength converters 500, 600, either.

Figure 3:
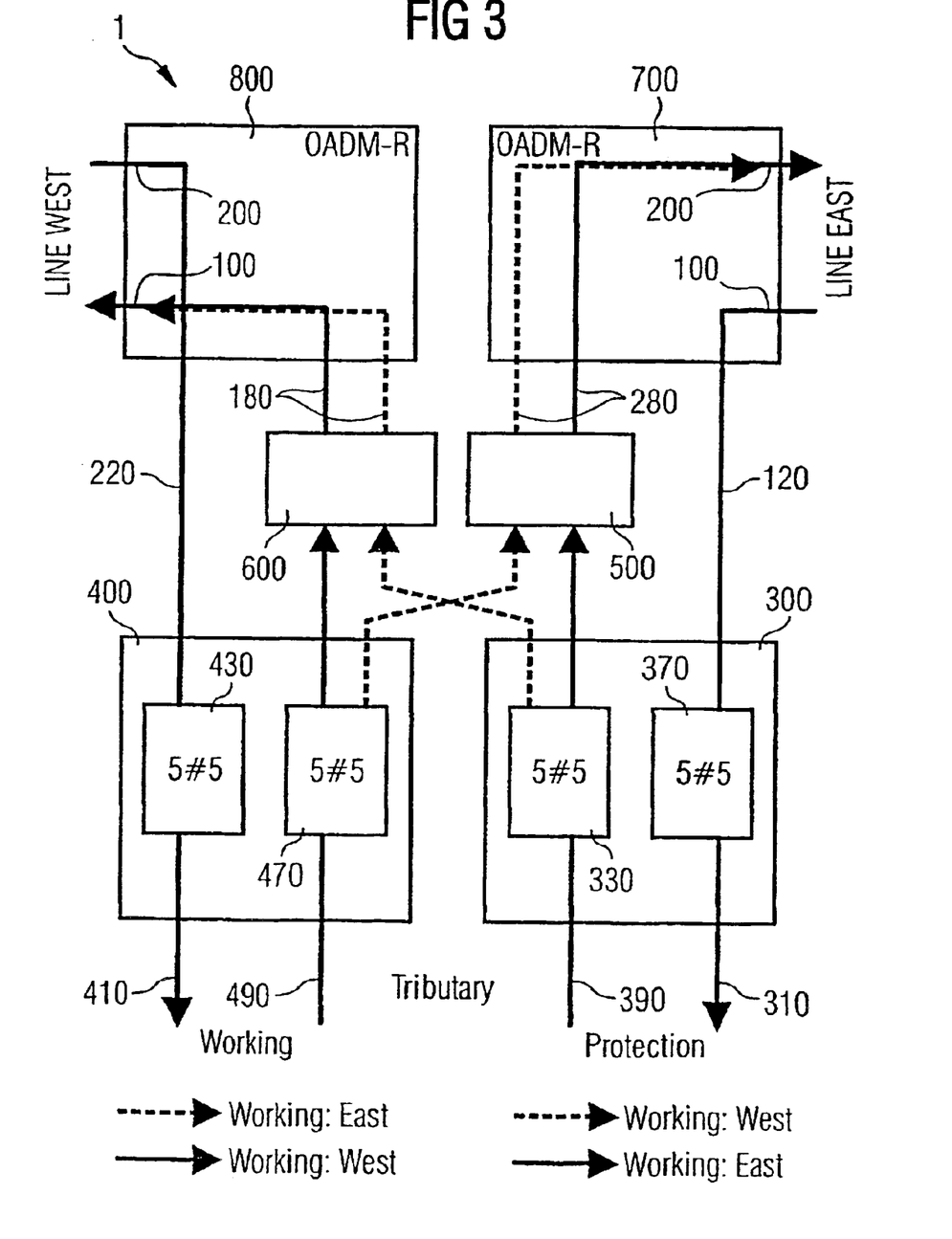
FIG. 3 shows a diagrammatic representation of a conversion of the wavelengths of an optical transmit signal in the case of a free choice of direction.

FIG. 3 shows a diagrammatic representation of a conversion of the wavelengths of an optical transmit signal with free choice of direction. The wavelength conversion of the optical transmit signals takes place as in FIG. 2. In addition, it is possible to feed the optical transmit signal of the working line (tributary input 490) into the second optical line 200 (line west) by interconnecting the tributary input 490 to the first wavelength converter 500 via the cross-connect 400. Analogously, transmit signals of the protection line (tributary input 390) can be interconnected to the first optical line 100 (line east). Pursuant to the arrangement described in FIGS. 2 and 3, the direction of an optical transmit signal in the network can be freely selected.

Figure 4:
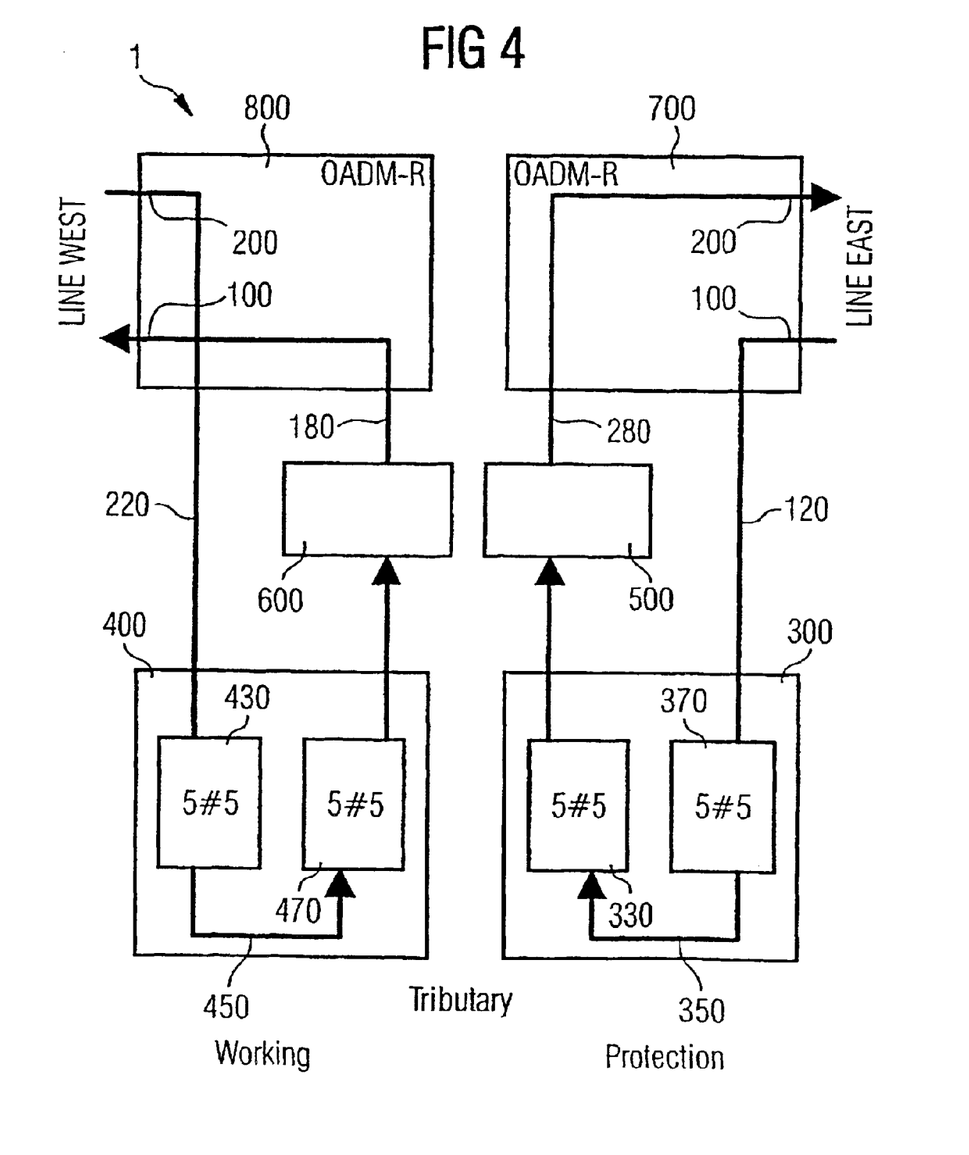
FIG. 4 shows a diagrammatic representation of a conversion of the wavelengths of an optical signal in the network with a change in direction.

FIG. 4 provides a diagrammatic representation of the conversion of the wavelengths of an optical signal in the network while simultaneously changing direction. The optical network node 1 with add-drop functions exhibits the same modules as the optical network node 1 with add-drop functions in FIG. 2.

In the text which follows, the wavelength conversion of an optical signal in the network via the protection line of the first optical line 100 (line east) and via the working line of the second optical line 200 (line west), respectively, is described. An optical signal with particular wavelengths, arriving via the first optical line 100 (line east), is transferred by the first module 700 and the first drop branch 120 to the first cross-connect where it is interconnected to the second lower connector 350 by the first 5#5 switching matrix 370, and again interconnected to the first wavelength converter 500 via the other first 5#5 switching matrix 330. The wavelength converter 500 converts the predetermined wavelengths of the optical signal to other wavelengths and feeds the optical signal with the converted wavelengths into the second optical line 200 (line west) via the second add branch 280 and the first module 700. The analogous situation applies to an optical signal of a particular wavelength in the network which is fed into the optical network node 1 with add-drop functions via the second optical line 200 (line west). The optical signal of the second optical line 200 (line west) is interconnected by the second module 800 and the second cross-connect 400 to the second wavelength converter 600 and is fed into the first optical line 100 (line east) via the second module 800 and the first add branch 180.

Similarly, a wavelength conversion of an optical signal in the network can take place via the working line of the first optical line 100 (line east) or, respectively, via the protection line of the second optical line 200 (line west). The working line of the first optical line (line east) is coupled out like the protection line of the first optical line 100 (line east) but is then conducted to the second cross-connect 400 where it is interconnected via the two second 5#5 matrices and the second lower connecting line 450 and is then conducted to the first wavelength converter 500. The optical signal which is now converted is then fed into the network as in the case of the protection line of the first optical line 100 (line east). The wavelength of an optical signal of the second optical line 200 (line west) is analogously converted via the protection line.

The optical network node 1 according to the present invention enables the wavelength of an optical signal in the network to be converted via the wavelength converters 500, 600. If no wavelength conversion by the network node according to the present invention is required, the wavelength converters 500, 600 will not perform a wavelength conversion.

Such an interconnection enables not only the wavelength of the optical signal to be converted but also the direction of the signal to be changed.

Figure 5:
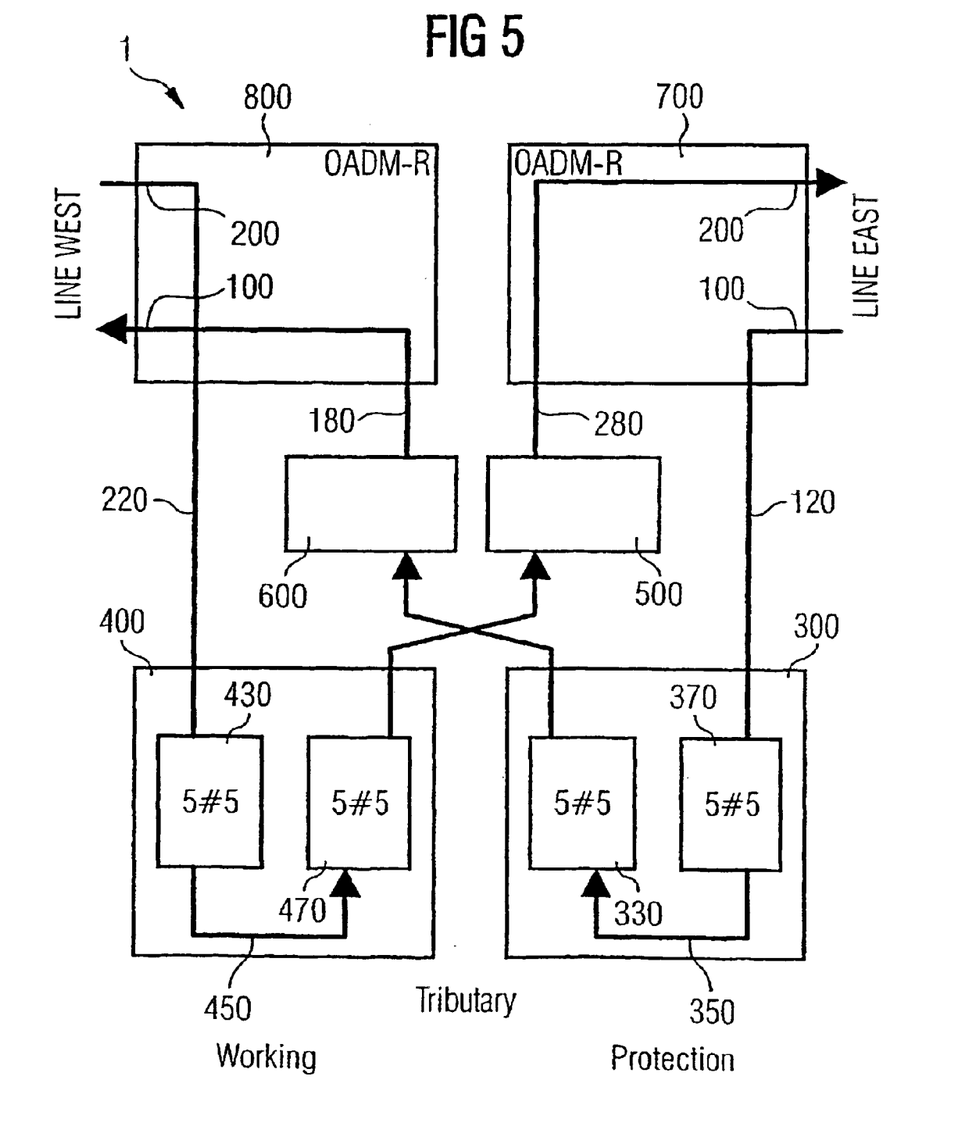
FIG. 5 shows a diagrammatic representation of one of the wavelengths of an optical signal in the network with the direction being maintained.

FIG. 5 diagrammatically shows a conversion without a change in direction of the wavelengths of an optical signal in the network. A wavelength conversion already has been described in FIG. 4.

Just as it is possible to convert the wavelength of an optical signal from a first optical line 100 (line east) to a second optical line 200 (line west), the wavelengths of the optical signal can be converted while retaining the optical line. The optical line is retained for the second optical line 200 (line west) for the working path and for the first optical line 100 (line east) for the protection path. The wavelength of the optical signal is converted while retaining the first optical line 100 (line east) in that the optical signal is conducted via the first drop branch 120 to the first cross-connect 300 from where it is interconnected to the second wavelength converter 600. The optical signal of the second optical line 200 (line west) is similarly interconnected. Interconnecting the optical signal from the second cross-connect 400 to the first wavelength converter 500 results in a wavelength conversion of an optical signal in the second optical line 200 (line west).

Retaining the direction of the signal while simultaneously converting the wavelength can be done by the working path of the first optical line 100 (line east) and the protection path of the second optical line 200 (line west). The optical signal of the first optical conductor 100 (line east) is then conducted via the first drop branch 120 to the second cross-connect 400 where it is interconnected to the second wavelength converter 600 and is fed into the first optical line 100 (line east) via the first add branch 180. In a mirror image, the optical signal of the second optical line 200 (line west) is interconnected for the protection path.

Figure 6:
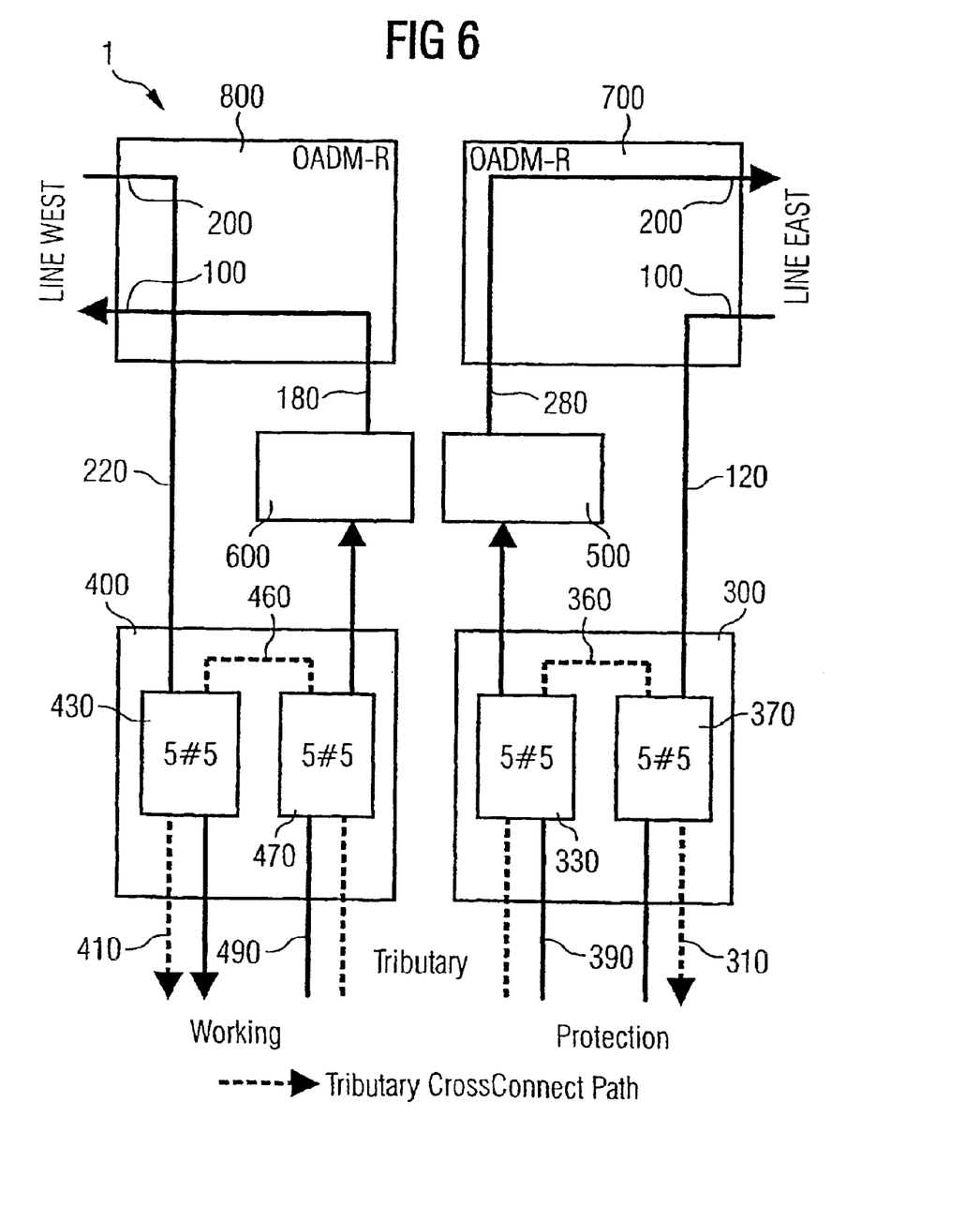
FIG. 6 shows a diagrammatic representation of an interconnection of an optical transmit signal to the inputs of the tributary side of the network node.

FIG. 6 shows the interconnection of the inputs of the tributary side. The optical network node 1 with add-drop functions has the same components as in FIG. 1. The inputs of the tributary side are interconnected by the first cross-connect 300 and the second cross-connect 400, the inputs and outputs of the working paths being via the second cross-connect 400 and the inputs and outputs of the protection paths being via the first cross-connect 300.

Optical transmit signals are applied to the tributary input 390 of the first cross-connect 300, interconnected via the first 5#5 matrix 330 to the first upper connector 360 and interconnected from there to the tributary output 310 via the other first 5#5 matrix 370. The same applies to optical transmit signals which are interconnected from the tributary input 490 to the tributary output 410 via the second cross-connect 400. Naturally, the tributary inputs 390, 490 and tributary outputs 310, 410 are freely selectable. In addition, the optical network node 1 still retains its add-drop functions.

The optical network node with add-drop functions according to the present invention created a possibility for configuring received optical signals or optical signals to be transmitted in a completely free manner.

The present invention is directed to a device and to a number of methods regarding an optical network node with add-drop and/or cross-connect functions. The network node according to the present invention is the interconnection of a first optical line via a first drop branch with a first cross-connect and a second cross-connect to a first and a second tributary output and the interconnection of a second optical line via a second drop branch with the first cross-connect and the second cross-connect to the first and second tributary outputs. In parallel therewith, a first tributary input is coupled into the second optical line via the first cross-connect either by a first wavelength converter and a second add branch or coupled into the first optical line by a second wavelength converter and a first add branch and a second tributary input is coupled into the second optical line via the second cross-connect either by the first wavelength converter and the second add branch or coupled into the first optical line by the second wavelength converter and the first add branch.

Via the optical network node according to the present invention, optical signals can retain or change their direction and/or retain or change their wavelengths.

In addition, the direction of the optical transmit signals is freely selectable and/or their wavelength can be retained or changed.

Lastly, the optical network node of the present invention enables optical transmit signals to be interconnected on the inputs of the tributary side.

Although the present invention has been described with reference to specific embodiments, those of skill in the art will recognize that changes may be made thereto without departing from the spirit and scope of the present invention as set forth in the hereafter appended claims.

What is claimed is:

1. An optical network node with at least one of add-drop functions and cross-connect functions, comprising:
   a first optical line with a first drop branch and a first add branch;
   a second optical line with a second drop branch and a second add branch;

a first cross-connect;

a second cross-connect;

a first wavelength converter; and a second wavelength converter;

wherein the first drop branch and the second drop branch are in each case connected to the first cross-connect and to the second cross-connect, the first add branch is connected to the first cross-connect and to the second cross-connect via the first wavelength converter and the second add branch is connected to the first cross-connect and to the second cross-connect via the second wavelength converter.

2. An optical network node as claimed in claim 1, wherein the first and second wavelength converters are tunable transponder modules.

3. An optical network node as claimed in claim 1, wherein the first cross-connect includes at least one first N#M switching matrix and at least one first K#L switching matrix, and the second cross-connect includes at least one second N#M switching matrix and at least one second K#L switching matrix.

4. An optical network node as claimed in claim 3, wherein N is equal to L and K is equal to M.

5. An optical network node as claimed in claim 3, wherein the first N#M switching matrix is connected to the first K#L switching matrix via a first lower connector and via a first upper connector.

6. An optical network node as claimed in claim 3, wherein the second N#M switching matrix is connected to the second K#L switching matrix via a second lower connector and via a second upper connector.

7. An optical network node as claimed in claim 3, wherein the first N#M switching matrix is connected to the first K#L switching matrix via a first lower connector and via a first upper connector, and the second N#M switching matrix is connected to the second K#L switching matrix via a second lower connector and via a second upper connector.

8. An optical network node as claimed in claim 1, wherein the first add branch and the second drop branch are arranged on a first module, and the second add branch and the first drop branch are arranged on a second module.

9. An optical network node as claimed in claim 1, wherein the first cross-connect may be used for paths of a protection line and the second cross-connect may be used for paths of a working line.

10. A method for selecting an optical path for optical signals in an optical network node from a first optical line of the optical network node into one of the first optical line and a second optical line of the optical network node, the method comprising the steps of:

providing the first optical line with a first drop branch and a first add branch;

providing the second optical line with a second drop branch and a second add branch;

connecting the first drop branch and the second drop branch in each case to a first cross-connect and to a second cross-connect;

connecting the first add branch to the first cross-connect and to the second cross-connect via a first wavelength converter;

connecting the second add branch to the first cross-connect and to the second cross-connect via a second wavelength converter;

coupling-out the optical signals into the first drop branch;

interconnecting the optical signals by one of the first cross-connect and the second cross-connect into one of the second add branch and the first add branch; and feeding the optical signals into one of the first optical line via the first add branch and the second optical line via the second add branch.

11. A method for wavelength conversion of optical signals in an optical network node from a first optical line of the optical network node into the first optical line, the method comprising the steps of:

providing the first optical line with a first drop branch and a first add branch;

providing the second optical line with a second drop branch and a second add branch;

connecting the first drop branch and the second drop branch in each case to a first cross-connect and to a second cross-connect;

connecting the first add branch to the first cross-connect and to the second cross-connect via a first wavelength converter;

connecting the second add branch to the first cross-connect and to the second cross-connect via a second wavelength converter;

coupling-out the optical signals into the first drop branch;

interconnecting the optical signals by the second cross-connect into the first add branch;

converting the wavelengths of the optical signals by the second wavelength converter; and feeding the converted optical signals into the first optical line via the first add branch.

12. A method for wavelength conversion of optical signals in an optical network node from a first optical line of the optical network node into one of the first optical line and a second optical line of the optical network node, the method comprising the steps of:

providing the first optical line with a first drop branch and a first add branch;

providing the second optical line with a second drop branch and a second add branch;

connecting the first drop branch and the second drop branch in each case to a first cross-connect and to a second cross-connect;

connecting the first add branch to the first cross-connect and to the second cross-connect via a first wavelength converter;

connecting the second add branch to the first cross-connect and to the second cross-connect via a second wavelength converter;

coupling-out the optical signals into the first drop branch;

interconnecting the optical signals into one of the first add branch by the second cross-connect and the second add branch by the first cross-connect;

converting the wavelengths of the optical signals by one of the first wavelength converter and the second wavelength converter; and feeding the converted optical signals into one of the first optical line via the first add branch and the second optical line via the second add branch.

13. A method for selecting an optical path for optical transmit signals in an optical network node from a first tributary input into one of a first optical line of the optical network node and a second optical line of the optical network node, the method comprising the steps of:

providing the first optical line with a first drop branch and a first add branch;

providing the second optical line with a second drop branch and a second add branch;

connecting the first drop branch and the second drop branch in each case to a first cross-connect and to a second cross-connect;

connecting the first add branch to the first cross-connect and to the second cross-connect via a first wavelength converter;

connecting the second add branch to the first cross-connect and to the second cross-connect via a second wavelength converter;

applying optical transmit signals via the first tributary input to the first cross-connect;

interconnecting the optical transmit signals into one of the first add branch and the second add branch by the first cross-connect; and feeding the optical transmit signals into one of the first optical line via the first add branch and the second optical line via the second add branch.

14. A method for wavelength conversion of optical transmit signals in an optical network node from a first tributary input into a first optical line of the optical network node, the method comprising the steps of:

providing the first optical line with a first drop branch and a first add branch;

providing the second optical line with a second drop branch and a second add branch;

connecting the first drop branch and the second drop branch in each case to a first cross-connect and to a second cross-connect;

connecting the first add branch to the first cross-connect and to the second cross-connect via a first wavelength converter;

connecting the second add branch to the first cross-connect and to the second cross-connect via a second wavelength converter;

applying the optical transmit signals via the first tributary input to the first cross-connect;

interconnecting the optical transmit signals into the first add branch via the first cross-connect;

converting wavelengths of the optical transmit signals by the second wavelength converter; and feeding the converted optical transmit signals into the first optical line via the first add branch.

15. A method for wavelength conversion of optical transmit signals in an optical network node from a first tributary input into one of a first optical line of the optical network node and a second optical line of the optical network node, the method comprising the steps of:

providing the first optical line with a first drop branch and a first add branch;

providing the second optical line with a second drop branch and a second add branch;

connecting the first drop branch and the second drop branch in each case to a first cross-connect and to a second cross-connect;

connecting the first add branch to the first cross-connect and to the second cross-connect via a first wavelength converter;

connecting the second add branch to the first cross-connect and to the second cross-connect via a second wavelength converter;

applying the optical transmit signals via the first tributary input to the first cross-connect;

interconnecting the optical transmit signals into one of the first add branch and the second add branch by the first cross-connect;

converting wavelengths of the optical transmit signals by one of the first wavelength converter and the second wavelength converter; and feeding the optical transmit signals into one of the first optical line via the first add branch and the second optical line via the second add branch.

16. A method for interconnecting optical transmit signals in an optical network node from a first tributary input to a first tributary output, the method comprising the steps of:

providing the first optical line with a first drop branch and a first add branch;

providing the second optical line with a second drop branch and a second add branch;

connecting the first drop branch and the second drop branch in each case to a first cross-connect and to a second cross-connect;

connecting the first add branch to the first cross-connect and to the second cross-connect via a first wavelength converter;

connecting the second add branch to the first cross-connect and to the second cross-connect via a second wavelength converter;

applying the optical transmit signals via the first tributary input to the first cross-connect; and interconnecting the optical transmit signals to the first tributary output via the first cross-connect.

* * * * *